Patented Dec. 13, 1949

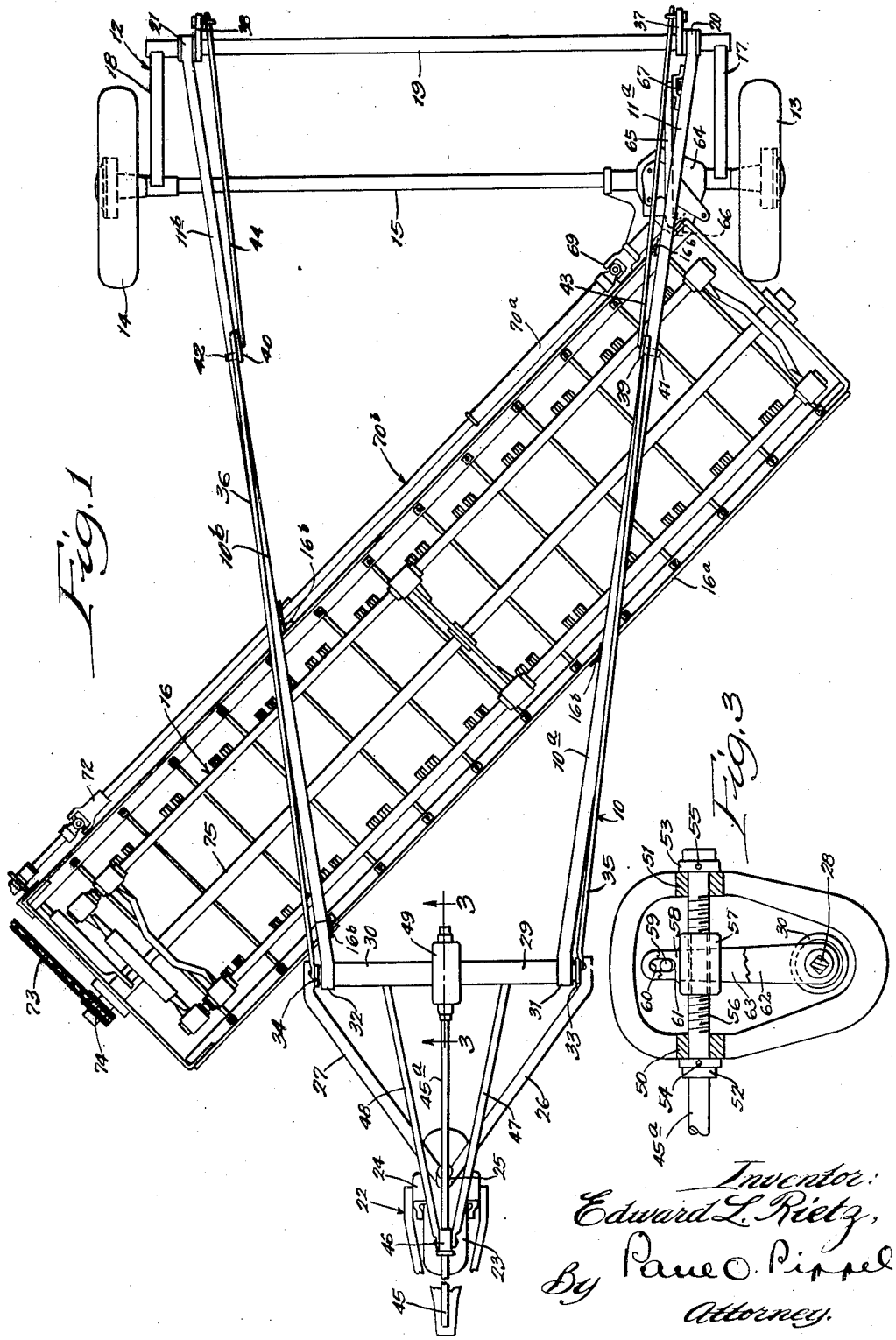

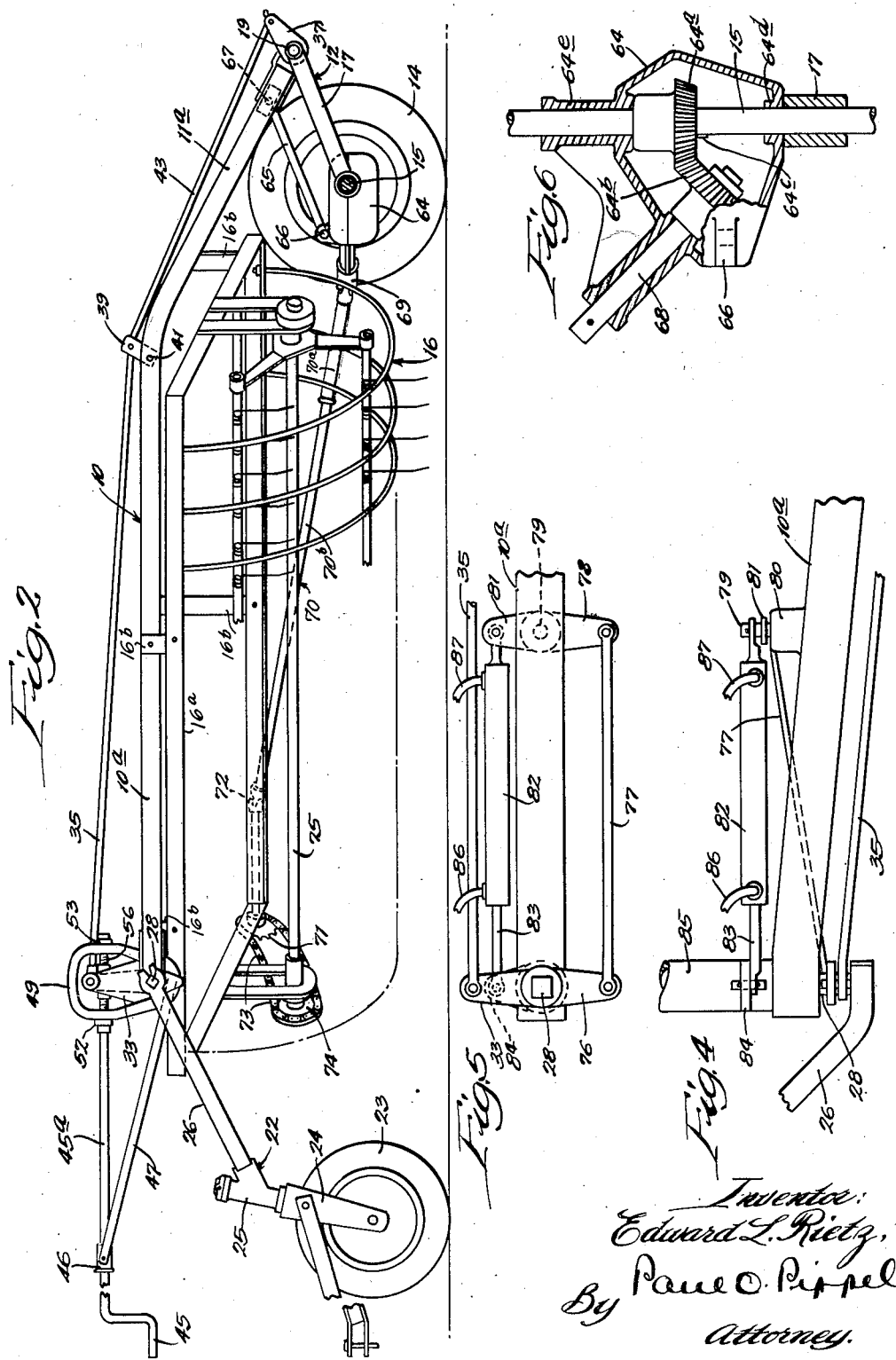

2,491,211

UNITED STATES PATENT OFFICE 2,491,211

SIDE DELIVERY RAKE

Edward L. Rietz, Riverside, Ill., assignor to International Harvester Company, a corporation of New Jersey Application December 18, 1944, Serial No. 568,667

5 Claims. (Cl. 56—377)

This invention relates to a new and improved side delivery rake and has for one of its principal objects the provision of means for maintaining the driving gear box in substantial level position regardless of the height adjustment of the raking cylinder.

An important object of the invention is to provide a parallel link suspension for automatic levelling of the driving gear box, whereby vertical adjustment of the rake cylinder will not hinder or affect driving thereof.

Another important object of the invention is to provide a side delivery rake wherein the diagonally positioned raking cylinder may be raised vertically uniformly from the front to the rear thereof.

A further important object of this invention is the provision of a side delivery rake of the front and rear wheel support type and wherein the raking cylinder suspended therebetween may be raised uniformly by the joint raising of the front and rear wheel supports.

Another and further important object is to provide a single control means for simultaneously tilting the front and rear wheel supports of a side delivery rake.

A still further important object of the invention is to achieve power lifting and lowering of the raking cylinder by the combined raising and lowering of the supporting arms of the front and rear wheel trucks.

Still another object of the invention lies in providing a self-contained manual lifting unit for jointly effecting the tilting of front and rear wheel trucks.

Other and further important objects of this invention will become apparent from the disclosures in the following specification and accompanying drawings, in which:

Figure 1 is a top plan view of the side delivery rake of this invention;

Figure 2 is a side elevation of the rake as shown in Figure 1;

Figure 3 is a detailed sectional view taken on the line 3—3 of Figure 1;

Figure 4 is a top plan view detail showing a modification of the invention;

Figure 5 is a side elevational view of the modified portion shown in Figure 4; and Figure 6 is a sectional view of the rake drive gearing.

As shown in the drawings:

The reference numeral 10 indicates generally a rake frame consisting of individual frame members 10a and 10b each having a downwardly inclined portion 11a and 11b at the rear thereof for the support of a wheel truck 12. The wheel truck 12 comprises a pair of wheels 13 and 14 joined by an axle 15. The axle 15 rotates with the rear ground wheels 13 and 14 and, as will later be described, forms the source of power for operating the rake cylinder 16. Arms 17 and 18 are journaled on the driving axle 15 and, in turn, are joined by a tubular cross-frame member 19. The depending portions 11a and 11b of the frame 10 are journally mounted on the cross tube 19 at 20 and 21.

It will be readily understood that raising of the wheel truck 12 will effect a raising or lowering of the frame 10. The raking cylinder 16 is provided with a rectangular frame 16a and is suspended by means of fixed links 16b from the frame members 10a and 10b in a diagonal position from the front to the rear of the implement, and a raising or a lowering of the frame 10 at its rearward end will cause a corresponding raising of the rearward end of the raking cylinder 16. With such construction and without a means for raising the forward end of the raking cylinder, the rake would operate unevenly. To overcome this ill effect, provision is made so that the front wheel truck 22 consisting of a wheel 23, a wheel holding fork 24, a yoke 25, and a pair of spreading arms 26 and 27 extending upwardly and rearwardly from the yoke 25 join a cross shaft 28 which is squared in cross-section. Each arm 26 and 27 is clamped to the square shaft 28 so that rotation of this shaft will cause a varying inclination of the arms 26 and 27.

The forward ends of the frame members 10a and 10b are fixedly attached by means of welding, or the like, to relatively large diameter pipe sections 29 and 30 at 31 and 32. The pipe sections 29 and 30 superpose the square shaft 28 which is adapted upon rotation to cause the raising or the lowering of the forward end of the raking cylinder 16, whereby a uniform height of the raking cylinder may be obtained from the front to the rear thereof.

One of the principal objects of this invention was stated to be the achievement of simultaneous raising and lowering of the front and rear wheel trucks through a single operating mechanism. Upwardly extending arms 33 and 34 are fixed to the square shaft 28 at the outer ends thereof. Link members 35 and 36 are attached to the upper ends of the arms 33 and 34, respectively, and each extends rearwardly substantially following the frame members 10a and 10b. Arms 37 and 38 are fastened to the cross member 19 at the rear end of the implement and extend upwardly and rearwardly therefrom. The rear ends of the links 35 and 36 are attached to swingable guide arms 39 and 40 which are provided at 41 and 42, respectively, on the frame members 10a and 10b. Additional links 43 and 44 join the swingable arms 39 and 40, respectively, and extend rearwardly, and are attached to the upper ends of the arms 37 and 38 respectively. It will be apparent that swinging of the forwardly positioned arms 33 and 34 will cause a similar swinging of the arms 37 and 38 through the linkage just described. The arms 37 and 38 are, in fact, upward extensions of the wheel supporting members 17 and 18, respectively, and a swinging of the arms 37 and 38 will cause a change in the angular inclination of the members 17 and 18 and, hence, a raising or a lowering of the rake supporting frame with respect to the ground level. It will be evident that rotation of this shaft 28 will cause a simultaneous raising or lowering of the front and rear wheel trucks 12 and 22 so that the frame 10 is raised uniformly throughout its entire length.

The particular means of effecting rotation of the cross-shaft 28 may be by manual controls or may be power operated from the power driven mechanisms on the pulling tractor. As shown in Figure 2 of the drawing, the rotation of the shaft 28 is effected by a hand-crank 45. The crank 45 has an extending arm 45a journaled in a bearing 46 which is supported by members 47 and 48 welded or otherwise attached to and projecting forwardly from the pipe members 29 and 30 respectively. A housing 49, preferably cast, is welded or otherwise fastened between the inner ends of the pipe members 29 and 30. The crank arm 45a extends longitudinally through the housing 49 and is further supported by sleeve bearings or bushings 50 and 51. The housing 49 is shown in greater detail in Figure 3 of the drawings. Thrust collars 52 and 53 are adapted to engage the crank arm 45a by means of pins 54 and 55 to insure a fixed longitudinal position of the crank arm 45a within the housing 49. The portion of the crank arm 45a within the housing 49 is threaded as shown at 56. A sleeve member 57 is internally threaded and engages the threaded portion 56 of the crank arm 45a. The sleeve 57 has an upwardly extending lug member 58 through which a pin 59 extends through slots 60 and 61 within arms 62 and 63. The arms 62 and 63 are spaced only a slight distance apart and are parallel one to the other. These arms are rigidly fastened to the square shaft 28. Rotation of the crank 45 will cause a movement of the sleeve member 57 along the threaded portion 56 of the crank and, through the medium of the pin 59, the arms 62 and 63 are given angular movement. The slots 60 and 61 permit rotation of the arms 62 and 63 with the shaft 28. The shaft 28 extends entirely across the front end of the implement through the pipe members 29 and 30 and through the central housing 49. Rotation of the crank, therefore, is effective to cause a uniform raising or lowering of the raking cylinder 16 by a simultaneous tilting of the front and rear wheel truck arms. The housing 49 is substantially self-contained, being welded between the pipe members 29 and 30 which are directly supported by the frame members 10a and 10b, respectively. No further support for the housing 49 is necessary.

The raking cylinder 16 has a ground drive which is secured from the rear wheels 13 and 14. These wheels 13 and 14 are keyed or otherwise fastened to the cross-shaft or axle 15 and, as they are pulled over the ground, they impart rotation to this shaft 15. A gear box 64 is mounted directly over the shaft 15, the internal structure comprising a pair of bevel gears, 64a and 64b. Bevel gear 64a is keyed or otherwise attached to the shaft 15 as shown at 64c. The box 64 is journaled for free rotation about the shaft 15 within the sleeve bearings 64d and 64e, but is maintained in a substantially horizontal position by means of a link 65 which is parallel to the wheel supporting member 17 as best shown in Figure 2. The link 65 is attached to the box 64 through an upwardly extending lug 66 on the box 64. The other end of the link 65 is attached to the frame member 11a at 67. The complementary bevel gear 64b within the box 64 has a forwardly extending shaft 68 which is parallel to the raking cylinder 16. A universal joint 69 joins the shaft 68 to a driven shaft 70, as best shown in Figure 1, which in turn drives a sprocket 71 through the medium of a universal joint 72. The driven shaft 70 is made in two parts, a square sleeve member 70a and a square rod member 70b. The rod 70b telescopes within the sleeve 70a and is driven thereby. The telescoping of the members 70a and 70b permits variations in the overall length of the shaft 70. These slight changes in distance between the universal joints 69 and 72 are caused by vertical adjustment of the raking cylinder thus necessitating a telescoping shaft 70. This construction including the spaced universal joints and the telescoping sleeve driving shaft is shown in my prior patent 2,403,401. A chain 73 joins the sprocket 71 with a sprocket 74 mounted directly on the raking cylinder shaft 75. The parallel link 65 which supports the gear box 64 maintains the gear box in substantially horizontal position regardless of the height position of the raking cylinder. This level maintenance of the gear box 64 contributes to reduced angular change between the driving shaft 68 and the driven shaft 70 through the universal joint 69. The power required to drive through a universal joint, the component parts of which are at a relatively straight angle with respect to each other, is very slight compared to the amount of power required to drive through a universal joint, the parts of which are at an angle considerably less than a 180° straight angle. The use of this parallel link 65 practically eliminates the need for the universal joint at 72 and all that is required is slight flexibility or greater tolerance to permit driving of the sprocket 71 even though the angle in the universal joint 69 is slightly changed. Drive through the joint 72 is efficient because the angular change of the driving element is kept at a minimum.

Figures 4 and 5 of the drawings show a modified method of effecting rotation of the shaft 28 and, hence, a raising and lowering of the front and rear wheel trucks. The method for raising and lowering the raking cylinder in Figures 1 and 2 is a manual means, whereas, the modification in Figures 4 and 5 is a power means for raising the rake. The housing 49 has been completely eliminated in the power operated device. The arm 33 has been retained in this power operated device but has been equipped with a downward extension 76. The link 35 is attached to the upper end of the arm 33, similarly to the manually operated means as shown in Figures 1 and 2. A link 77 is attached to the lower end of the arm 76 and extends rearwardly to the lower end of a lever 78 pivoted at 79 on a lug 80 extending inwardly from the frame member 10a. An upward extension 81 of the lever 78 is adapted to support one end of a hydraulically operated cylinder 82. An extensible piston 83 of the hydraulic cylinder 82 is affixed to an upwardly extending ear or lug 84 on a pipe member 85 superposing the cross-shaft 28. Flexible conduits 86 and 87 extend forwardly to the pulling tractor and are supplied with fluid under pressure from the tractor through the medium of hydraulic control mechanisms on the tractor. When the piston 83 of the hydraulic cylinder 82 is extended, the lever 78 is rotated about its pivot 79 so that the downward extension of the lever 78 is swung forwardly and the link 77 moves the downward extension 76 of the arm 33 forwardly, and the arm 33 itself moves rearwardly to effect a lowering of the raking cylinder. A reverse movement of the piston 83 of the hydraulic cylinder 82 will effect an opposite raising movement of the raking cylinder. It is quite easy to transmit forces hydraulically and such a construction might prove more advantageous than the mechanical screw device or the power operated hydraulic system.

Numerous details of construction may be varied throughout a wide range without departing from the principles disclosed herein and I, therefore, do not propose limiting the patent granted hereon otherwise than as necessitated by the appended claims.

What is claimed is:

1. In a side delivery rake comprising a frame, a raking cylinder suspended from said frame, a tiltable rear wheel truck for effecting raising and lowering of said frame, said wheel truck including a pair of ground wheels, an axle driven between said ground wheels, and a pair of arms journaled on said axle and extending upwardly to a fixed attachment on said frame, a gear box journaled on said axle having gears therein driven by said axle, shaft means having universal joints therein for transmitting drive from said gears to said raking cylinder, and a connecting link extending between said gear box and said frame in a substantially parallel position with respect to said pair of arms, whereby the gear box is maintained substantially horizontal despite the position of tilt of the rear wheel truck to effect continued efficient drive through the universal joints in the shaft means.

2. In a side delivery rake comprising a frame, a raking cylinder diagonally suspended from said frame, a tiltable rear wheel truck for effecting raising and lowering of said frame, said wheel truck including a pair of ground wheels, an axle driven between said ground wheels, and a pair of arms journaled on said axle and extending upwardly to a fixed attachment on said frame, a gear box journaled on said axle having means for transmitting drive to the forward end of said raking cylinder, a drive shaft extending from said gear box forwardly along the diagonally positioned raking cylinder, a sprocket adapted to drive said raking cylinder, flexible joints in said drive shaft between the gear box and said sprocket, and a connecting link extending between said gear box and said frame and being substantially parallel to said pair of arms, whereby the gear box is maintained substantially horizontal despite the position of tilt of the rear wheel and permits efficient driving through the flexible joints by keeping the change from a straight angle in the drive shaft at a minimum.

3. In a side delivery rake comprising a frame, a raking cylinder diagonally suspended from said frame, a tiltable rear wheel truck for effecting raising and lowering of said frame, said wheel truck including a pair of ground wheels, an axle driven between said ground wheels, and a pair of arms journaled on said axle and extending upwardly to a fixed attachment on said frame, a gear box journaled on said axle and having means for transmitting drive to the forward end of said raking cylinder, a drive shaft extending from said gear box forwardly along the diagonally positioned raking cylinder, a sprocket adapted to drive said raking cylinder, flexible joints in said drive shaft between the gear box and said sprocket, and a connecting link extending between said gear box and said frame and being substantially parallel to said pair of arms, whereby the gear box is maintained substantially horizontal despite the position of tilt of the rear wheel truck and the flexible joints are maintained at minimum inclination.

4. In a side delivery rake comprising a frame, a raking cylinder suspended from said frame, a tiltable rear wheel truck for effecting raising and lowering of said frame, said wheel truck including a pair of ground wheels, an axle driven between said ground wheels, and a pair of arms journaled on said axle and extending upwardly to a fixed attachment on said frame, a tiltable front wheel truck, a gear box journaled on said rear truck axle, shaft means having joints therein for transmitting drive from said gear box to said raking cylinder, and a connecting link extending between said gear box and said frame and being substantially parallel to said pair of arms, whereby the gear box is maintained substantially horizontal despite the position of tilt of the rear and front wheel trucks to permit unhindered drive through the joints in the shaft means.

5. In a side delivery rake comprising a frame, a raking cylinder suspended from said frame, a tiltable rear wheel truck for effecting raising and lowering of said frame, said wheel truck including a pair of ground wheels, an axle driven between said ground wheels, and a pair of arms journaled on said axle and extending upwardly to a fixed attachment on said frame, a tiltable front wheel truck, means for simultaneously raising and lowering said front and rear wheel trucks, a gear box journaled on said rear truck axle having gear means for transmitting drive to said raking cylinder, and a connecting link extending between said gear box and said frame and being substantially parallel to said pair of arms, whereby the gear box is maintained substantially horizontal despite the position of tilt of the rear and front wheel trucks and as a result maintains the relative change in position of the driving means at a minimum.

EDWARD L. RIETZ.

REFERENCES CITED

The following references are of record in the file of this patent:

UNITED STATES PATENTS

| Number | Name | Date |
|---|---|---|
| 886,681 | Dain | May 5, 1908 |
| 935,456 | Blackstone et al. | Sept. 28, 1909 |
| 1,007,676 | Dain | Nov. 7, 1911 |
| 1,257,169 | Yarbrough | Feb. 19, 1918 |
| 2,025,257 | Vaughn et al. | Dec. 24, 1935 |
| 2,059,205 | Buffington | Nov. 3, 1936 |
| 2,335,510 | Hansen | Nov. 30, 1943 |

FOREIGN PATENTS

| Number | Country | Date |
|---|---|---|
| 478,115 | Great Britain | Jan. 12, 1938 |